Aug. 27, 1940. F. R. MAXWELL 2,212,841
APPARATUS FOR THE AERATION OF LIQUIDS
Filed Feb. 23, 1938
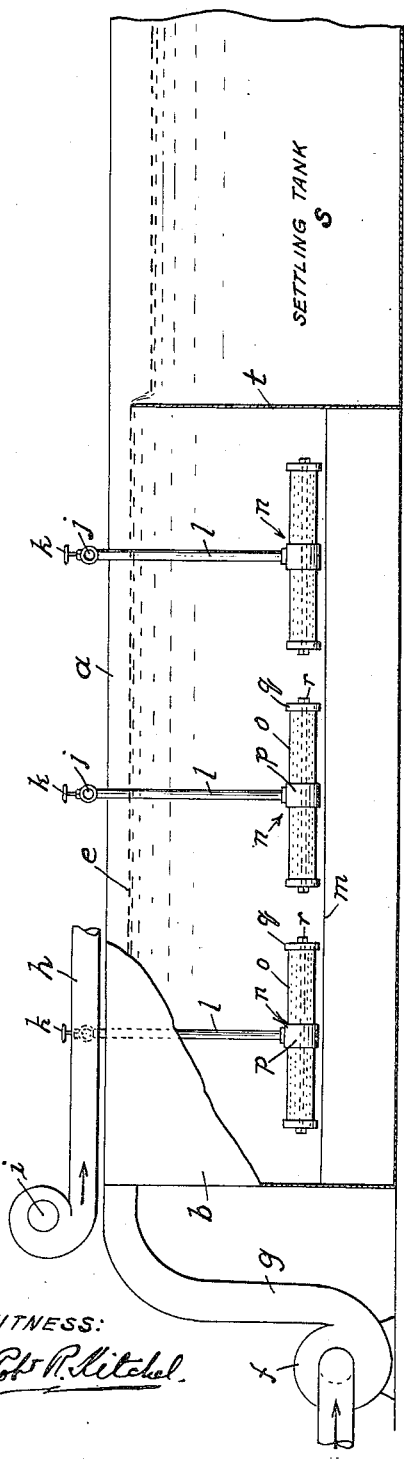
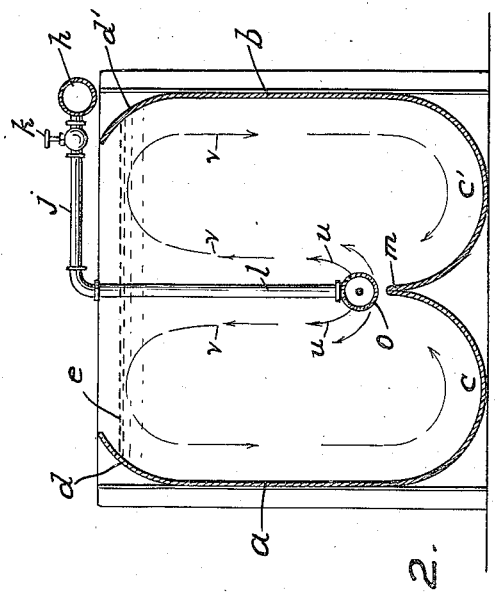
INVENTOR
Frank R. Maxwell
BY
Busser & Harding
ATTORNEYS.

Patented Aug. 27, 1940

2,212,841

UNITED STATES PATENT OFFICE 2,212,841

APPARATUS FOR THE AERATION OF LIQUIDS

Frank R. Maxwell, Rose Valley, Pa., assignor to Sun Shipbuilding & Dry Dock Company, Chester, Pa., a corporation of Pennsylvania Application February 23, 1938, Serial No. 191,944

1 Claim. (Cl. 261—124)

This invention relates to an improvement in apparatus for the aeration of liquids containing finely divided solid matter to effect agglomeration thereof, and more particularly relates to an apparatus for effecting the aeration of sewage to effect agglomeration of finely divided solid matter therein.

The apparatus in accordance with this invention will be highly efficient and economical for the partial aeration of sewage for the mechanical agglomeration of finely divided or colloidal solid matter as a step preliminary to sedimentation thereof and will be equally efficient and economical for the aeration of sewage in connection with the so-called activated sludge process.

Generally speaking, apparatus in accordance with this invention will comprise an aeration tank so formed in combination with means for the introduction of air in finely divided form that liquid containing finely divided solid matter, as sewage, introduced into the tank will circulate in a plurality of streams with respect to the locus of the introduction of air, with the result that the effect of the aeration with a given amount of air will be more thorough than heretofore and that finely divided solid matter will be effectively agglomerated.

The apparatus in accordance with this invention lends itself readily to combination with other elements for use in the treatment of sewage, as, for example, a settling tank.

Having now indicated in a general way the nature and purpose of this invention, I will proceed to a detailed description of a preferred form with reference to the accompanying drawing in which:

Figure 1 is a side view, partly broken away and partly in section, of a form of apparatus according to this invention.

Figure 2 is a cross-sectional view of the apparatus shown in Figure 1.

Referring to the several figures $a$ indicates a tank, which may be formed of sheet metal with suitable bracing $b$, or which may be formed of concrete, or other suitable material. The tank $a$ may have any desired dimensions dependent upon desired capacity, but in general will desirably be of substantially greater length than width and will be of limited depth such as will insure the circulation hereinafter described.

The bottom of the tank $a$ is in the form of a pair of adjacent troughs $c$, $c'$ extending longitudinally of the tank $a$ and the upper portions of the sides of the tank are curved inwardly as at $d'$, $d'$, (Fig. 2) from their upper edges to below the normal level $e$ of sewage in the tank when it is in operation. The bottom of the tank $a$ may be formed in the semi-circular form shown in Figure 2.

Sewage is introduced into one end of the tank by means of a pump $f$ through a conduit $g$, which preferably discharges into the top of the tank.

A conduit $h$ extends longitudinally of the tank along one of its edges and is connected to and adapted to receive air under pressure from a blower $i$. Conduits $j$, $j$, provided with valves $k$, $k$, extend laterally from the conduit $h$ to the center of the tank $a$ and are connected to conduits $l$, $l$, which extend vertically down into the tank $a$ to points spaced above the adjacent edges $m$ of the troughs $c$, $c'$ which form the bottom of the tank.

Air distributors $n$, $n$ are connected to the lower ends of the vertical conduits $l$, $l$ and extend longitudinally of and adjacent to the adjacent edges $m$ of the troughs $c$, $c'$. Supports for the distributors $n$, $n$ may extend from the adjacent edges $m$ of the troughs, if desired.

The air distributors $n$, $n$ may be of any suitable design or material for the discharge of air in finely divided form into sewage in the tank. Preferably the air distributors are formed from cylinders $o$ of porous material, as carborundum, clamped to collar $p$, by means of heads $q$, $q$ and a bolt $r$.

The tank $a$ may, as shown in Figure 1, be combined with a settling tank $s$ and in such case the end wall $t$ of tank $a$ may be of such a height as to form a weir over which sewage will flow from tank $a$ to the settling tank $s$. The settling tank may be formed or equipped in any well known manner for the removal of sludge settled therein. In the alternative sewage may be discharged from the tank $a$ in any suitable manner and to any suitable point.

In the operation of the apparatus according to this invention, sewage will be introduced into the tank $a$ through conduit $g$ at a rate such that it will have a slow rate of flow therethrough to discharge over the weir $t$, or otherwise, from the upper portion of the tank. At the same time, air from conduit $h$ will be introduced into the sewage in finely divided form through the air distributors $n$, $n$. The air from the distributors $n$, $n$ aerates the sewage and will rise therein as indicated by the arrows $u$ (Fig. 2). The rising air will cause the sewage to rise in the center of the tank above the adjacent edges of the troughs $c$, $c'$ and, due to the double trough formation of the bottom, to descend adjacent to the side of the tank. The inward curvature of the upper portions of the sides will act in cooperation with the double trough formation of the bottom to facilitate and promote the descent adjacent the sides.

As a consequence of the ascent of the sewage in the center of the tank and its descent adjacent the sides, a double circulation, as indicated by the arrows $v, v$ (Fig. 2) will be set up.

The double circulation will result not only in a highly efficient aeration of the sewage with a given quantity of air, but will also result in a highly efficient agglomeration of finely divided and colloidal solid matter enabling efficient separation thereof from the liquid component of the sewage, by sedimentation, for example, in the settling tank $s$.

It will be understood that it is not intended that this invention shall be limited to the details given herein by way of illustration of a preferred embodiment, since it will be obvious that various modifications in detail may be made without departing from the scope of the invention.

What I claim and desire to protect by Letters Patent is:

Apparatus for the aeration of a liquid containing finely divided solid matter for the agglomeration thereof, comprising, in combination, a tank having its bottom in the form of a pair of adjacent longitudinally extending semi-circular troughs extending from the sides of the tank to the longitudinal center thereof and a plurality of cylindrical distributors for the introduction of air into the tank positioned in the tank, the said cylindrical distributors being spaced above the adjacent edges of the troughs a distance less than the radius of curvature of the troughs and extending longitudinally thereof with their axes in a vertical plane extending between adjacent edges of the troughs.

FRANK R. MAXWELL.